June 24, 1969  G. W. DEEMIE ET AL  3,451,608

FRICTION WELDING APPARATUS

Filed Oct. 24, 1967  Sheet 1 of 3

INVENTORS
GERALD W. DEEMIE
IRA H. SAGE

BY
Fryer, Tjensvold, Feix, Phillips + Lempio
ATTORNEYS

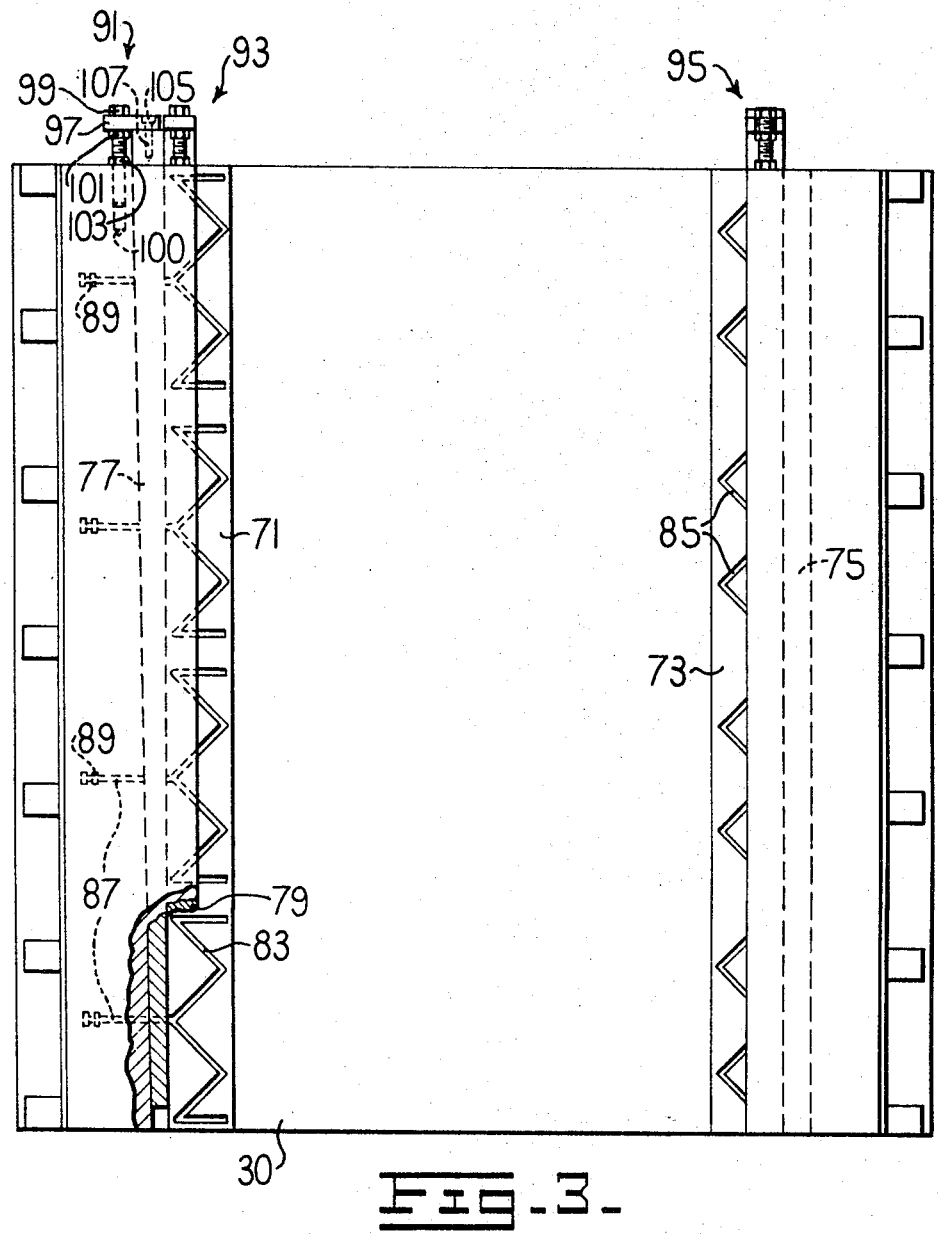

United States Patent Office 3,451,608
Patented June 24, 1969

3,451,608
FRICTION WELDING APPARATUS
Gerald W. Deemie, and Ira H. Sage, Peoria, Ill., assignors to Caterpillar Tractor Co., Peoria, Ill., a corporation of California
Filed Oct. 24, 1967, Ser. No. 677,555
Int. Cl. B23k 27/00
U.S. Cl. 228—2                    8 Claims

ABSTRACT OF THE DISCLOSURE

A friction welder having a specially constructed wear resistant slot and rail assembly between the movable carrier and the carrier support for insuring precise concentric alignment between the workpieces to be welded and wherein means are provided for easily and accurately adjusting both the horizontal and vertical clearance between said slot and rails to maintain said alignment should wear occur.

Background of the invention

This invention relates to improvements in friction welding apparatus of the general type wherein two workpieces are subjected to relative rotation while in rubbing contact with each other to generate frictional heat to raise the workpieces to a suitable welding temperature whereupon the relative rotation subsides and the workpieces become bonded to each other.

It is also to be understood that the invention is specifically applicable to apparatus for performing the inertia welding process. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating weights and the bonding cycle is concluded.

Friction welding is a process which involves quite high rotational speeds between the workpieces being bonded. The friction welding process also involves the application of high axial thrust loads along the longitudinal axes of the workpieces being bonded or welded. The simultaneous application of high rotational speeds and high axial loads at the interface of the workpieces being bonded presents a critical problem in the construction of friction welding apparatus in that such apparatus must be constructed so as to insure that the workpieces are kept in close concentric alignment during the bonding or welding operation. It should be evident that the rotational and axial forces involved in the process are so great that any appreciable degree of misalignment at the interface between the workpieces being bonded may result in a structurally unsound weld. Such misalignment problems also make it difficult, if not impossible, to hold uniform tolerances in the weld zone between the workpieces and result in costly machining and finishing operations which can tend to diminish the attractiveness of the process in large scale production operations.

Many prior art friction welding machines have been constructed with a view toward eliminating misalignment problems between the workpieces. However prior art devices for eliminating misalignment between the workpieces involve expensive and complicated mechanisms which are susceptible to a high degree of breakage and wear due to the nature of the process and the tremendous forces involved. Most such prior art devices for preventing misalignment between the weld pieces wear out quite rapidly and their replacement and/or repair results in a high proportion of down time in relation to the total operating life of a friction welding machine.

It is the principal object of the present invention to provide a guiding and supporting apparatus for the movable carrier of a friction welding machine which will maintain accurate concentric alignment between the workpieces to be bonded. It is a further and closely related object of the invention to provide a very wear-resistant supporting and guiding apparatus for the spindle of a friction welding machine.

A still further object of the invention is to provide supporting and guiding apparatus for the spindle of a friction welding machine in which both vertical and horizontal clearance adjustment may be easily and accurately maintained.

Other objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. It is recognized that other embodiments of the invention employing the same or equivalent principles may be used and structural changes may be made as desired by those skilled in the art without departing from the present invention and the purview of the appended claims.

Brief description of the drawings

FIG. 3 is a top view broken away in part illustrating further details of the present invention.

Description of the preferred embodiment

Figure 1:
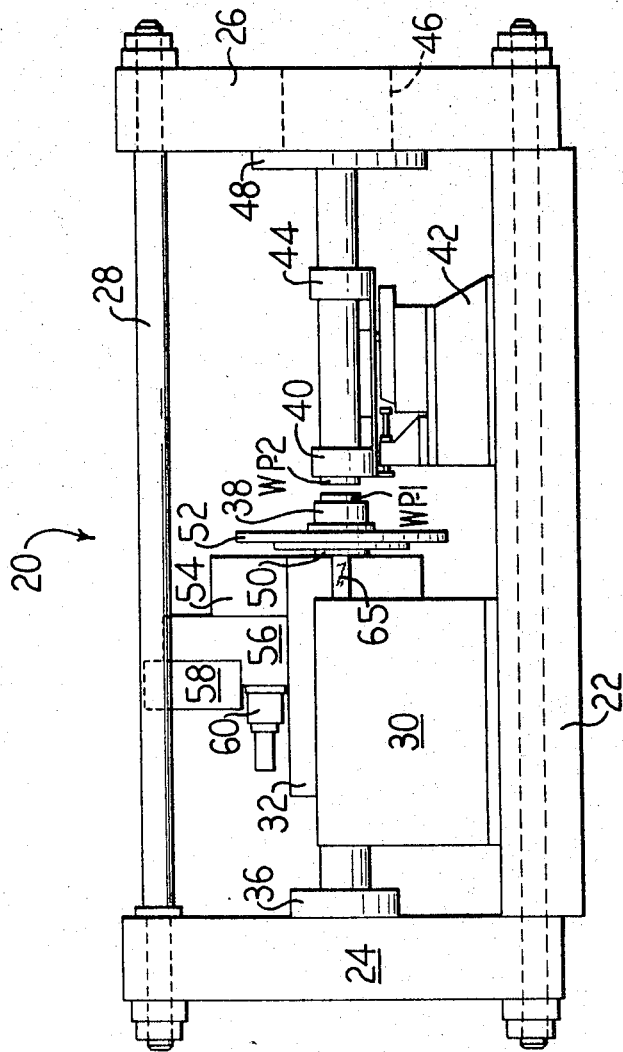
FIG. 1 is a side elevation illustrating one exemplary embodiment of a friction welding machine constructed in accordance with the present invention.

A friction welding machine constructed in accordance with one exemplary embodiment of the present invention is indicated generally by the reference numeral 20 in FIG. 1. The machine 20 has a main base member 22 which has attached at the ends thereof an upstanding head frame member 24 and a similar upstanding back frame member 26. It should be understood that the machine could be oriented in the vertical rather than the horizontal plane, if desired. A plurality of guide bars 28 are utilized to attach the frame members 24 and 26 to each other and to the base member 22 in a manner which provides a very rigid frame structure to which extremely heavy fixed and movable members may be attached.

A spindle guide and support block 30 is rigidly mounted upon the machine base 22 at the head frame end of the machine. A spindle carrier 32 is slidably mounted within the spindle support block 30 for reciprocal movement along the longitudinal axis of the machine 20. The specific structure of the mounting assembly between support block 30 and spindle carrier 32 will be discussed in further detail with respect to FIGS. 2 and 3. For the present it will suffice to understand that the carrier 32 is provided with longitudinal rail members one of which is shown at 65 for slidably engaging the support block 30. A conventional ram assembly 36 having its cylinder end attached to the back frame member 24 and its rod end attached to the carrier 32 provides the motive force for reciprocating the carrier 32 longitudinally of the fixed guide and support block 30.

The two parts to be welded, workpieces WP-1 and WP-2, are mounted within chucks 38 and 40. The chuck 40 does not rotate and is mounted on a tailstock fixture 42. A second chucking fixture 44 is also mounted on the tailstock 42 for use when welding relatively long workpieces such as workpiece WP-2 shown in FIG. 1. If the workpiece WP-2 is unusually long it may extend through an aperture 46 formed in the back frame member 26. However, with the exemplary workpiece WP-2 shown in FIG. 1 a backup plate 48 covers the aperture 46 and abuts against the workpiece WP-2 in order to provide additional support along the longitudinal axis of the workpiece WP-2.

The chuck 38 is mounted on a spindle 50, and the chuck and spindle are mounted for rotation within the carrier 32. The rotary spindle 50 is adapted to receive flywheels 52 which may be of various size and mass depending upon the particular application of the machine. Mounted upon the carrier 32 are suitable drive train elements for imparting rotation to the spindle 50 which drive train includes motor means 54, a transmission 56, speed change gears 58, and a suitable mechanism 60 such as a clutch or hydraulic ram for engaging and disengaging the spindle 50.

It is to be understood that the flywheel weights 52 are mounted on the spindle 50 so that the welding machine 20 can be operated as an inertia welding machine as described in United States Patent No. 3,273,233 and as described in further detail below.

A welding operation to join a first workpiece to a second workpiece can be performed by operating the machine in the following manner. One of the weld pieces WP-1 is firmly clamped in the rotatable chuck 38 located on the spindle 50. The other weld piece WP-2 is firmly clamped in the nonrotatable chuck 40 which is located on the tailstock fixture 42 of the machine. Upon actuation of the motor 54, the flywheel 52 and the workpiece WP-1 are accelerated to a predetermined velocity.

Once the predetermined velocity has been attained, the motor 54 is disconnected or shut down and the ram mechanism 36 is actuated to move the carrier 32 and rapidly rotating workpiece WP-1 into contact with the stationary workpiece WP-2. As the two workpieces are brought into contact under the upsetting pressure applied through ram 36, heat is generated at the contacting surface or interface of the weld pieces. This heating increases until the workpieces reach the weld temperature, at which time the upsetting pressure, applied by the ram 36 at either a constant or varying pressure, causes flashing or upsetting to occur. During this heating and flashing, the rotational velocity of the spindle member 50 has continued to decrease. At the time the rotation of the spindle ceases, upsetting has taken place and the weld is completed.

Figure 2:
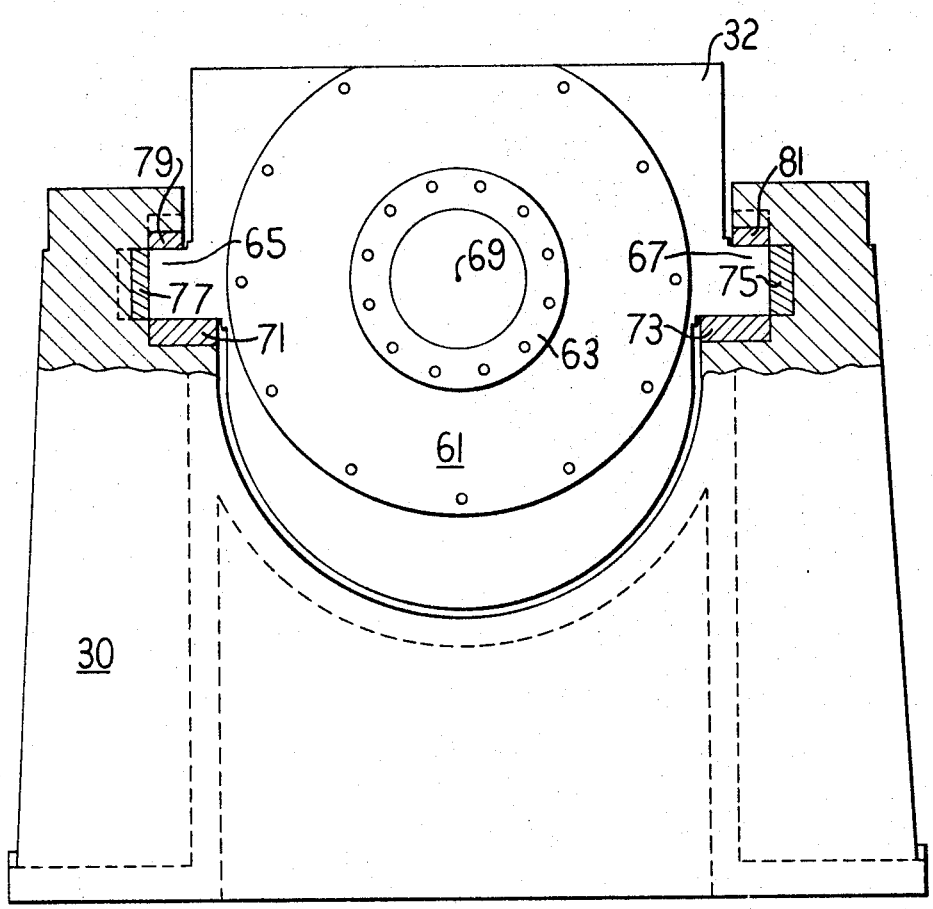
FIG. 2 is a front elevation partially in section illustrating structural details of the present invention.

FIG. 2 illustrates a front view partially in section of the spindle carrier assembly 32 and the support and guide block assembly 30 in which the carrier 32 is slidably mounted. The rotary spindle assembly (not shown) is situated inside the spindle carrier 32 behind cover plate 61, and a flange plate 63 is fastened to the end of the spindle. The rotary chuck 38, while not shown in FIG. 2, would ordinarily be attached to the flange plate 63 for use in a welding operation.

Two rectangular shaped rails 65 and 67 run lengthwise of the spindle carrier 32. At this point, it should be noted that the rail members 65 and 67 are preferably located centrally of a work-center line or point 69 for maximum stability during the welding operation. The bottom surfaces of rails 65 and 67 rest against and are supported by two rectangular shaped hardened metal ways 71 and 73. The outer edge of rail 67 rests against a hardened machine side way 75 and the outer edge of rail 65 rests against a hardened metal, tapered gib 77. The top surfaces of rails 65 and 67 are in contact with hardened metal, tapered top gibs 79 and 81. Vertical clearance adjustment of the spindle carrier 32 is provided by the two tapered top gibs 79 and 81, while horizontal clearance adjustment of the carrier 32 is provided by the tapered side gib 77.

FIG. 3 shows a top view partially in section of the carrier support block 30 wherein the spindle carrier 32 has been removed. Portions of the bottom ways 71 and 73 are visible, and side way 75 and side gib 77 are shown in dotted-line detail. The two top gibs 79 and 81 are not shown but are similar to the side gib 77 in that the taper on all three adjustable gibs is approximately 0.188 inch per foot. Oil grooves 83 and 85 are provided in the bottom ways 71 and 73 and while not shown similar oil grooves are also machined in the tapered gibs 77, 79 and 81. Oil is fed to these grooves through bores 87 which connect to an oil supply (not shown) by means of fittings 89.

Adjustment of the side gib 77 is accomplished by means of an adjusting assembly shown generally at 91. At this juncture it should be pointed out that though not illustrated a similar gib and adjusting assembly could be provided in connection with side way 75. Adjustment of the top gibs 79 and 81 is accomplished by similar adjusting assemblies 93 and 95. The adjustment of the side gib and the two top gibs is accomplished by individual means to prevent any cocking or sticking of the spindle carrier 32. Normally, however, adjustment of the top gibs 79 and 81 should preferably be made at the same time as adjustment of the side gib 77.

The adjusting assemblies 91, 93 and 95 are identical and are composed of the following elements which are only illustrated in detail with respect to adjusting assembly 91. Thus the main elements of each adjusting assembly comprise a plate 97, a bolt 99, two jam nuts 101 and 103, and two cap screws 105 (only one of which is shown). The cap screws 105 fit through holes in plate 97 and screw into threaded holes 107 in the end of the respective gibs (gib 77 with respect to adjusting assembly 91). The two jam nuts 101 and 103 respectively tighten against plate 97 and against the spindle support block 30.

After many production runs during which a great number of parts are welded on the friction welding machine 20, it may be determined that some wear has taken place between the spindle carrier 32 and the support block assembly 30 such that either and/or both horizontal and vertical clearance adjustments are necessary in order to insure proper concentric alignment between weld pieces WP-1 and WP-2.

The clearance adjustment may be accomplished at the adjusting assemblies 91, 93 and 95 in the following manner. The jam nuts 101 and 103 are respectively loosened from the plate 97 and the support block 30. Bolt 99 is then tightened into the threaded bore 100. Since the head of the bolt 99 engages the plate 97, tightening of the bolt forces the plate forward toward the support block 30. As previously noted, the other end of plate 97 is fastened to the ends of the gibs (in this case gib 77) by means of cap screws 105 which are fitted into the threaded bores 107 in the gib 77. Thus, tightening of the bolt 97 also forces the tapered gib 77 forward into the support block assembly 30. The forward movement of the tapered gibs takes up any looseness or wear between the rails 65 and 67 formed on the carrier 32 and the support block assembly 30. In this manner precise concentric alignment between workpieces WP-1 and WP-2 may be maintained.

It should be recognized that while the carrier 32 and support block 30 therefor have been depicted in association with the rotating workpiece WP-1, such carrier and support block could, of course, be utilized with respect to the nonrotating workpiece WP-2. With such an arrangement, the nonrotating workpiece WP-2 would be axially moved into contact with the rotating workpiece WP-1 to perform the welding operation. It should further be understood that the rail and slot elements for slidably supporting the carrier 32 on the support block 30 could be reversed such that the slots are formed on the carrier and the rails are formed on the support block without departing from the scope and spirit of the invention.

We claim:
1. In a friction welding machine for joining a first workpiece to a second workpiece by means of relatively rotating the workpieces and forcing them into contact at a common interface to generate frictional heat to raise the workpieces to a suitable bonding temperature whereupon the relative rotation subsides and the workpieces become bonded to each other, the improvement comprising, a generally rectangular-shaped open-centered frame structure; a guide block assembly fixed to a base portion of said frame near one end of said frame; said guide block having a generally U-shaped internal cavity formed therein; a generally rectangular longitudinally extending guide opening formed in each of the side walls of said U-shaped cavity; a carrier member having means for holding one of said workpieces to be welded; said carrier having a longitudinally extending rail member on each side thereof; said rail being complementary and interengaging said guide opening on each surface of said opening to permit sliding movement of said carrier relative to said fixed guide block assembly.

2. An improved friction welding machine as set forth in claim 1 wherein said guide openings and said rails are located centrally of the work-center line of the workpiece holding means located on said carrier to provide maximum stability between said carrier and said guide block during a friction welding operation.

3. An improved friction welding machine as set forth in claim 2 wherein at least one of said guide openings is provided at its side wall with a hardened tapered side gib which is adjustable longitudinally of the guide opening, and wherein both said guide openings are provided at their top walls with a hardened tapered top gib which is adustable longitudinally of the guide opening whereby the amount of both vertical and horizontal clearance between said rails and said guide openings may be controlled by movement of said gibs to overcome any misalignment caused by wear between said rails and said guide openings.

4. A friction welding machine comprising, a frame structure; a tailstock fixed to said frame structure to fixedly hold a first workpiece against rotation; a guide and support block assembly fixed to said frame in longitudinal alignment with said tailstock; a carrier supported by and slidable longitudinally of said support block assembly, said carrier having a rotatable spindle and chuck assembly for holding a second workpiece for rotation with said spindle and chuck assembly; said carrier having longitudinally extending, rectangular shaped rails on each side thereof; said guide and support block assembly having mating rectangular shaped slots for closely receiving said rails and permitting longitudinal sliding movement between said carrier and said support block assembly; and means including a hydraulic ram for moving said carrier longitudinally of said support block assembly.

5. A friction welding machine as set forth in claim 4 wherein the bottoms of the support block slots are provided with hardened metal ways on which the rails of said carrier rest.

6. A friction welding machine as set forth in claim 5 wherein the tops of the support block slots are provided with hardened metal, tapered top gibs which contact the top surface of said rails, means for longitudinally adjusting said tapered top gibs relative to said support block; and wherein the side of one of said slots is provided with a hardened metal side way which contacts the outer edge of one of the rails, and the side of the other of said slots is provided with a hardened metal, tapered side gib which contacts the outer edge of the other of said rails, and means for longitudinally adjusting said tapered side gib relative to said support block.

7. A friction welding machine as set forth in claim 6 wherein means are provided for carrying lubrication to the contact areas between said slots and said rails, said last-mentioned means including grooves machined in the contacting surfaces of both said ways and said gibs.

8. In a friction welding machine for joining a first workpiece to a second workpiece by means of relatively rotating the workpieces and forcing them into contact at a common interface to generate frictional heat to raise the workpieces to a suitable bonding temperature whereupon the relative rotation subsides and the workpieces become bonded to each other, the improvement comprising, a frame structure; a tailstock fixed to said frame structure for holding said first workpiece to be welded; a first assembly comprising a guide and support block fixed to said frame in longitudinal alignment with said tailstock; a second assembly comprising a carrier supported by and slidable longitudinally of said first assembly, said second assembly having means for holding said second workpiece to be welded; said slidable connection between said first assembly and said second assembly comprising a longitudinally extending rectangular shaped rail element formed on each side of one of said assemblies; a complementary and mating rectangular shaped slot located on the other of said assemblies for closely receiving said rails and permitting longitudinal sliding movement between said first and second assemblies.

References Cited
UNITED STATES PATENTS
3,396,893    8/1968    Cress _____ 228—2

RICHARD H. EANES, Jr., *Primary Examiner.*